Sept. 2, 1958  J. L. GRAHEK  2,849,806
PELLET COOLER
Filed Feb. 9, 1955
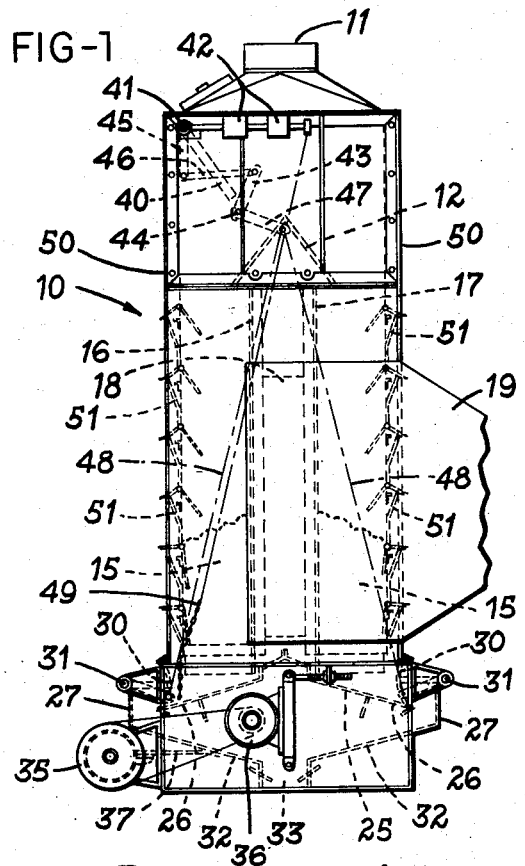
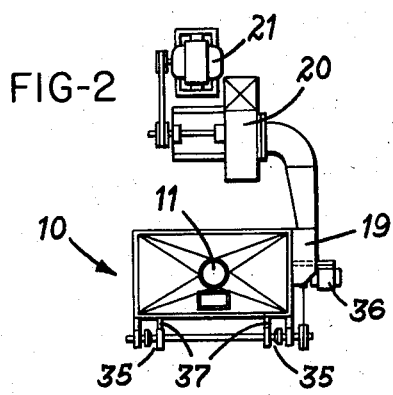
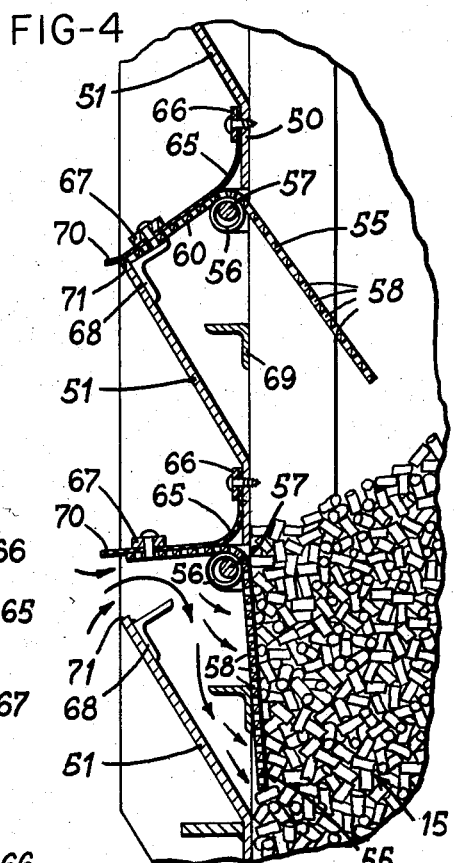
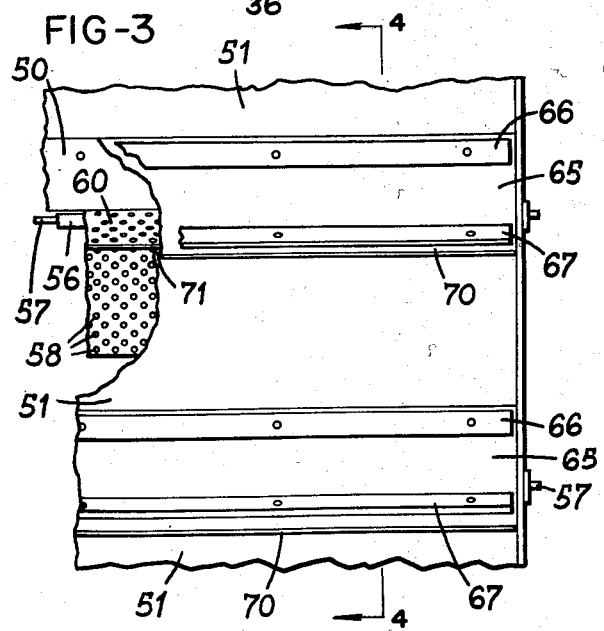
INVENTOR.
JOSEPH L. GRAHEK
BY
Marechal, Biebel, French & Bugg
ATTORNEYS

United States Patent Office 2,849,806
Patented Sept. 2, 1958

2,849,806

PELLET COOLER

Joseph L. Grahek, Muncy, Pa., assignor to Sprout, Waldron & Company, Inc., Muncy, Pa., a corporation of Pennsylvania Application February 9, 1955, Serial No. 487,054

4 Claims. (Cl. 34—174)

This invention relates to apparatus for cooling and drying materials and more particularly to apparatus for cooling and drying masses of newly formed compressed pellets or tablets of pulverous materials such as animal feed and the like.

In the manufacture of extruded or compressed pellets or tablets of various pulverous materials the pulverous material to be pelleted is introduced as a damp or soggy mass or mash to an extruding or compressing operation in which the material is compressed into a hard self-sustaining pellet or tablet. Frequently the mass of material is at elevated temperature, as well as damp, as may result from the admixture of steam therewith prior to compressing into pellet form. Accordingly, it may be desired to cool and/or dry the pellets after the forming step and prior to packaging, shipment, storage, or other processing.

If it is desired to accomplish such cooling and/or drying of the newly formed pellets in, for example, a cooling and drying tower with louvered side walls through which air is drawn, it has been found that nonuniform results are obtained because of the tendency for air to enter louvers above the level of pellets in the tower in a manner which by-passes the pellets in the tower during filling and emptying operations.

According to the present invention, however, a cooling and drying tower is provided such that louvers in the side walls thereof are individually closeable in such manner that substantially all the air drawn in through the louvers is directed to circulate through the mass of pellets in the tower, rather than to by-pass the pellets. Moreover, the opening and closing of the louvers is automatically accomplished as the level of the mass of pellets within the tower changes with increasing or decreasing quantities of pellets in the tower.

It is, accordingly, one object of this invention to provide cooling and drying apparatus of the character described having air inlet louvers in the sides thereof and means for opening and closing the louvers to direct the flow of air through the tower.

Another object of this invention is to provide in a cooling and drying tower of the character described having air inlet louvers in the sides thereof means for selectively and individually opening and closing the louvers to direct circulating air into the tower at various levels thereof.

Still another object of this invention is to provide in a cooling and drying tower of the character described automatic flap closures for louvers in the sides of the tower to open and close individually and selectively louvers at various levels in the tower as the level of pellets to be cooled therein varies with increasing or decreasing quantities of pellets.

Still a further object of this invention is to provide in a cooling and drying tower of the character described controllable air inlet louvers and automatic means for opening and closing the louvers operable by the quantity of pellets in the tower in response to the level of pellets in the tower.

Other objects and advantages of this invention will be apparent from the following description, the accompanying drawings, and the appended claims.

In the drawing,

Fig. 1 is an end view of a cooling and drying tower embodying this invention;

Fig. 2 is a top plan view of a cooling and drying tower embodying this invention and its associated forced draft blower assembly;

Fig. 3 is a detailed view on a larger scale of a portion of the side of a cooling and drying tower embodying this invention; and Fig. 4 is a section along the lines 4—4 of Fig. 3.

Referring to the drawing, in which like reference characters refer to like parts throughout the several views thereof, a cooling and drying tower 10, particularly adapted to the cooling and drying of animal feed pellets received directly from an extrusion type pellet mill, is shown as an illustrative embodiment of the invention. The pellets, having been formed in a pellet mill (not shown) from a soggy mass or mash of pulverous material, are conveyed to tower 10 and enter the inlet opening 11 at the top thereof. After entering the inlet 11, the pellets fall through the tower and are deflected by the peaked baffle 12 into two piles 15 within the tower. The two piles 15 are separated within the tower by two foraminous partitions 16 and 17 running beneath baffle 12 substantially from one end of the tower to the other. At one end of the tower between partitions 16 and 17 is an air exhaust opening 18 leading to an air duct 19 through which air is circulated and withdrawn from the tower by a blower 20 powered by motor 21.

The bottom of tower 10 is formed by a pan 32 having upper inclined chute portions 25 and mounted for oscillating motion beneath the two piles of pellets 15. The downwardly extending edge portions 26 of chute 25 terminate short of the sides 27 of pan 32 in the bottom portion of tower 10 leaving a free passage between the edge portions 26 of pan 25 and the upwardly extending sides 27 of bottom pan 32. Arcuate gates 30 are pivotally mounted at 31 for movement to open or close selectively the passage between pan edges 26 and side portions 27.

When the gates 30 are raised to open the passage between 26 and 27, pellets from the piles 15 within the tower are allowed to slide down the inclined chute 25, past gate 30, and drop onto the lower inclined portions of bottom pan 32 leading to the discharge opening 33 at the bottom of tower 10. To facilitate such withdrawal of pellets from the piles 15, pan 32 and chutes 25 are vibrated or oscillated through an eccentric drive arrangement indicated at 35, powered by motor 36, and connected to pan 32 as by strap 37.

The opening and closing of gates 30 to permit discharge of pellets through the discharge opening 33 is automatically controlled through a baffle 40 pivotally mounted at 41 in the upper portion of the tower. Baffle 40 is normally maintained at approximately a 35° angle from vertical by counterweights 42. The pivoted baffle 40 is linked to a bell crank 43, pivoted at 44, by the linkage 45, 46, while the lower arm 47 of bell crank 43 is connected by rods 48 to the pivoted gates 30.

Since the gates 30 are normally in closed position, pellets will enter the inlet 11 of tower 10, be deflected into two piles 15 by the peaked baffle 12, and fall to the bottom of the tower to rest upon chutes 25. With continued introduction of additional pellets into the inlet 11, the level of pellets at the two piles 15 builds up in the tower toward the top thereof. As the tower fills, the weight of pellets entering the tower and impinging upon baffle 40, will force baffle 40 toward a vertical position against the action of counterweights 42. As the baffle 40 is forced to a vertical position by the weight of pellets entering the inlet 11, this movement of baffle 40 is transmitted through the linkage 45—46, the bell crank 43, and rods 48 to raise gates 30 to open position thereby allowing pellets to flow downwardly and outwardly off edge portions 26 of vibrating chutes 25 and out of the tower 10 through the discharge opening 33 at the bottom thereof.

This operation and functioning just described for controlling the opening of gates 30, it will be noted, provides automatic regulation so that, after the tower is substantially full, the flow of pellets out of the discharge opening 33 at the bottom of tower 10 is automatically correlated with the rate at which newly formed pellets enter the inlet opening 11 of tower 10 and impinge on baffle 40, thereby maintaining an automatic regulation of pellet flow rate so that newly admitted pellets spend a satisfactorily long time in the cooling and drying tower 10 before being discharged therefrom. A pull chain or similar device 49 operative on the counter-weighted linkage 41, 42, etc., is also provided for manually opening the gates 30.

The side walls 50 of tower 10 are provided, for a substantial extent of the height thereof, with a plurality of air admitting louvers 51 through which air may be drawn into and through tower 10 by means of blower 20. As indicated in more detail in Figs. 3 and 4, the louvers 51 are provided with adjustable closures comprising a plate 55 bent longitudinally about and affixed to a hollow tubular member 56. Plates 55 are mounted in louvers 51 by means of rods 57 within the tubes 56 for pivotal movement of the plates 55 about the axis of rod 57 from a closed position as shown in the upper louver of Fig. 4 to an open position as shown in the lower louver of Fig. 4.

At least the substantially vertical portion of the plate 55 is perforated as indicated at 58 to admit passage of air when the plate 55 is in the position shown in the lower louver of Fig. 4. The upper portion 60 of plate 55 forms a flap valve closure for louvers 51 and is joined to the side walls 50 of tower 10 by means of a sheet of rubber 65 or other flexible, substantially air impervious material, affixed to the wall 50 as by an overlying strap 66 and to plate 55 by a similar strap 67, which also acts as a counterweight tending to urge member 60 into closed position. Two limiting stops 68 and 69 are mounted within the louvers for the closed and open positions, respectively, of pivoted plate 55, and the edge portion 70 of the rubber sheet 65 extends sufficiently beyond the edge of portion 60 of plate 55 as to form a seal with the edge 71 of louver 51 when plate 55 is pivoted to the closed position as indicated in the upper louver of Fig. 4. Also as indicated in Fig. 4, the inside diameter of tube 56 is somewhat greater than the diameter of rod 57 to admit of operational and construction tolerance in the assembly and functioning of plate 55 as it pivots about rod 57 in the two positions as shown.

From the foregoing it will be noted that, with the plate 55 maintained in the upper position in Fig. 4, as by the resilient action of rubber sheet 65, air is effectively sealed off and precluded from entering such closed upper louver 51. As the quantity of pellets builds up in the pile 15, however, the weight of pellets, acting upon the perforated inside surface of plate 55, will force it to pivot toward the vertical and lever portion 60 and sheet 65 to the open position thereof indicated in the lower louver of Fig. 4. It will be understood that the dimensions of the lever arm of plate 55 within the tower are correlated with the closure portion 60 and the biasing action of sheet 65, plates 67, etc., such that the force exerted by the pellets within the tower is sufficient to raise portion 60 as desired.

In such position, air may be drawn in through the louver and through the perforations 58 in plate 55 by the suction action of blower 20. Since the plates 55 are automatically pivoted to open the louvers 51 only after a sufficient quantity of pellets have built up beside them to force them into the position shown in the lower louver of Fig. 4, the only louvers open for the admission of air will be those below the level of pellets in the tower so that substantially all the air drawn through the tower by blower 20 is directed through and among the pellets in the pile 15, all the louvers above the level of pellets in the tower being maintained in closed position.

It will be noted that, in the absence of such selective individual closure of the louvers, e. g., with all the louvers always open, air drawn through the tower by blower 20 would have a tendency to enter the upper louvers and take the path of least resistance which would, in effect, by-pass the pellets in the lower portion of the tower effecting non-uniform cooling and drying thereof. Accordingly, the invention provides a simple and economical construction whereby the air admitting louvers in the sides of cooling and drying tower are automatically and selectively opened or closed by the action of the pellets in the tower and in response to the level of pellets in the tower to force substantially all the air drawn through the tower by blower 20 to penetrate the mass of pellets in the tower for uniform cooling and drying thereof. As will be apparent from the foregoing description, the louvers open one by one as the level of pellets in the tower rises above filling of the tower, and close one by one as the level of pellets in the tower falls as at the completion of a pellet mill run.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In cooling and drying apparatus of the character described for pellet material having side walls with air admitting louvers therein and means for sucking air inwardly through said louvers, each of said louvers having an outwardly extending lip, the combination which comprises a flap valve for closing each said louver along said lip interrupting passage of air therethrough, means for mounting said flap valve for pivotal movement from a closed position closing the outside of said louver to an open position, a resilient member for biasing said flap valve normally into said closed position, a lever on said flap valve adjacent said pivotal mounting thereof and extending into said apparatus through said louver for contact with material contained therein through said louver, said lever being affixed at substantially a right angle to said flap valve for moving said flap valve into open position upon downward pressure on said lever within said apparatus, means on said lever for admitting passage of air therethrough when said flap valve is in open position, and the dimensions of said lever being correlated with the biasing force of said resilient member such that the downward force exerted on said lever by material in said apparatus is sufficient to operate said lever to open said flap valve against the action of said resilient member in response to the level of said material in said apparatus.

2. In cooling and drying apparatus of the character described for pellet material having side walls with air admitting louvers therein and means for sucking air inwardly through said louvers, the combination which comprises flap valves extending along and for closing the outside of said louvers interrupting passage of air therethrough, means along one edge of each said louver for mounting said flap valves for pivotal movement from a closed position to an open position, means for biasing said flap valves normally into said closed position, a lever member on said flap valves adjacent said pivotal mounting and extending into said apparatus through said louvers for contact with material contained therein, said lever members being disposed at substantially a right angle with respect to said flap valves for extending diagonally into said apparatus when said flap valves are in closed position and for moving said flap valves into open position upon downward pressure on said lever members within said apparatus, means on said lever members for admitting passage of air therethrough, said air admitting means being smaller than the particular size of material contained in said apparatus for preventing outward passage of said material through said lever members and said louvers, and stop means for limiting downward movement of said lever member to a substantially vertical position.

3. In cooling and drying apparatus of the character described for pellet material having side walls with air admitting louvers extending transversely therealong, the combination which comprises closure members for said louvers having a substantially L-shaped cross section, means for mounting said closure members extending along the openings of said louvers with one surface of said L-shaped members being substantially air-impervious and adapted to close said louver openings, said mounting means including pivot means for movement of said closure members from a closed position to an open position and with a portion of each of said L-shaped members extending angularly into said apparatus for contact with material therein in said closed position of said closure members, means on said inwardly extending portions of said closure members for admitting passage of air through said louvers into said apparatus when said members are in said open position, said inwardly extending portions of said closure members being adapted to move said closure members into open position upon downward pressure of material contained in said apparatus on said inwardly extending portions, and means for biasing said L-shaped members into closed position.

4. In cooling and drying apparatus of the character described for pellet material having side walls with air admitting louvers extending transversely therealong, the combination which comprises foraminous members having a substantially L-shaped cross section, means for mounting said foraminous members extending along said louvers with one leg of said L-shaped cross section closing the outer openings of said louvers and the other leg extending angularly within said apparatus, said mounting means including pivot means for movement of said foraminous members from an open to a closed position, flexible substantially air impervious sheets covering said closing legs of said foraminous members rendering the same substantially air impervious when in said closed position, means including said impervious sheets for biasing said formanious members into said closed position, said inwardly extending legs of said foramionsu members being adapted to move said closing legs thereof into open position upon downward pressure of material contained in said apparatus in response to the level of said material therein, and stop members for limiting downward movement of said inwardly extending legs to a substantially vertical position thereof preventing passage of material contained in said apparatus outwardly through said louvers.

References Cited in the file of this patent

UNITED STATES PATENTS

| | | |
|---|---|---|
| 1,500,610 | Dodds | July 8, 1924 |
| 2,634,673 | Maho | Apr. 14, 1953 |

FOREIGN PATENTS

| | | |
|---|---|---|
| 747,055 | France | Mar. 21, 1933 |